(12) United States Patent
Kim et al.

(10) Patent No.: US 8,590,501 B1
(45) Date of Patent: Nov. 26, 2013

(54) VARIABLE INTAKE SYSTEM AND METHOD

(75) Inventors: Taehwan Kim, Siheung-Si (KR); Seunghyun Jang, Paju-Si (KR)

(73) Assignee: Managed Programs LLC, Auburn Hills, MI (US)

( * ) Notice: Subject to any disclaimer, the term of this patent is extended or adjusted under 35 U.S.C. 154(b) by 254 days.

(21) Appl. No.: 12/885,590

(22) Filed: Sep. 20, 2010

Related U.S. Application Data

(60) Provisional application No. 61/346,032, filed on May 18, 2010.

(51) Int. Cl.
*F02M 35/10* (2006.01)

(52) U.S. Cl.
USPC ............ 123/184.55; 123/184.56; 123/184.21; 251/62; 251/160; 251/162; 251/163

(58) Field of Classification Search
USPC ............. 123/184.55, 184.56, 184.21; 251/62, 251/160, 162, 163
See application file for complete search history.

(56) References Cited

U.S. PATENT DOCUMENTS

| | | | | |
|---|---|---|---|---|
| 2,501,635 | A * | 3/1950 | Schmidt | 251/163 |
| 5,329,897 | A * | 7/1994 | Hemphill et al. | 123/190.17 |
| 5,715,782 | A * | 2/1998 | Elder | 123/184.61 |
| 6,138,628 | A * | 10/2000 | Alex et al. | 123/190.1 |
| 6,182,633 | B1 * | 2/2001 | Rauch | 123/337 |
| 6,235,231 | B1 * | 5/2001 | Martin | 264/328.1 |
| 6,443,110 | B2 * | 9/2002 | Qattan | 123/80 BA |
| 6,604,506 | B2 * | 8/2003 | Tanaka et al. | 123/336 |
| 6,889,649 | B2 * | 5/2005 | Klotz et al. | 123/184.55 |
| 7,213,560 | B2 * | 5/2007 | Jones et al. | 123/184.61 |
| 8,082,900 | B2 * | 12/2011 | Germain et al. | 123/336 |
| 2008/0035107 | A1 * | 2/2008 | Torii | 123/336 |
| 2009/0288629 | A1 * | 11/2009 | Ito et al. | 123/184.56 |

* cited by examiner

*Primary Examiner* — Noah Kamen
*Assistant Examiner* — Long T Tran

(57) ABSTRACT

An intake manifold assembly is disclosed that utilizes a barrel valve apparatus comprised of segments and connectors. The barrel valve apparatus and its housing component can be tapered and flexible. A protrusion such as a draft can be used to seal the performance of the barrel valve apparatus without a seal. Openings in the barrel valve apparatus can possess an integrated bellmouth shape.

20 Claims, 22 Drawing Sheets

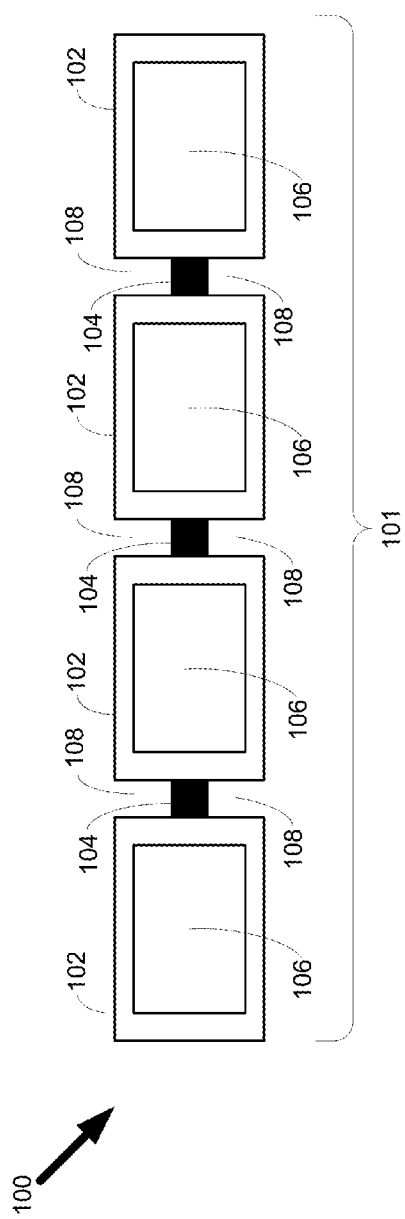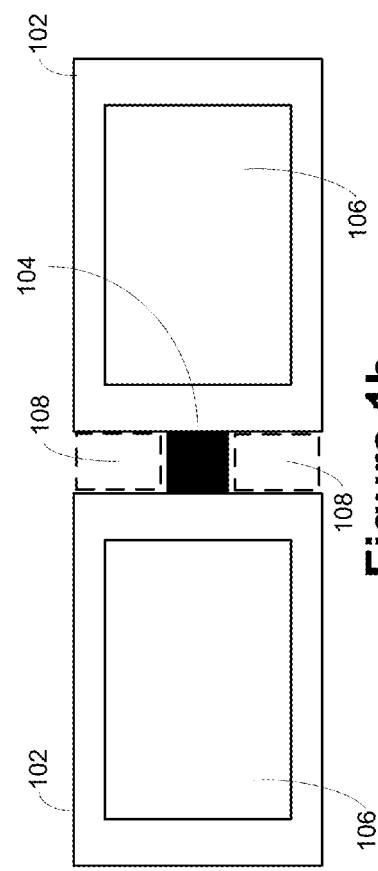

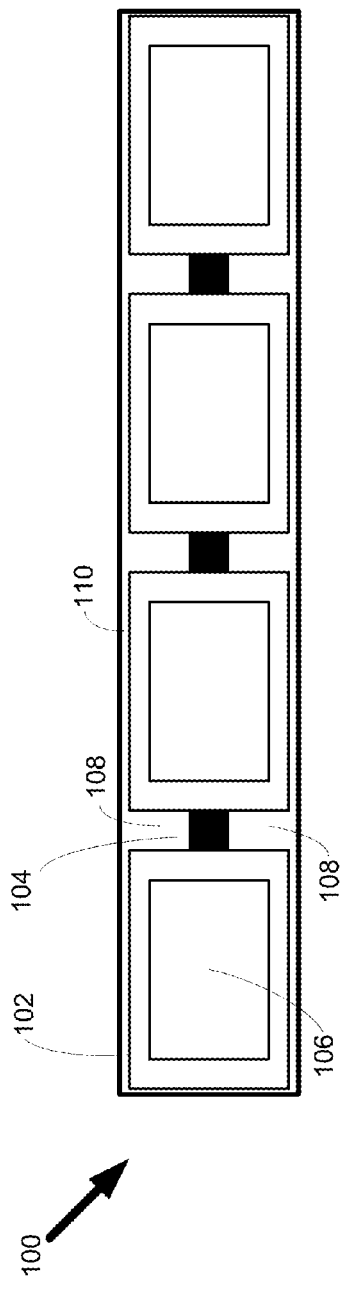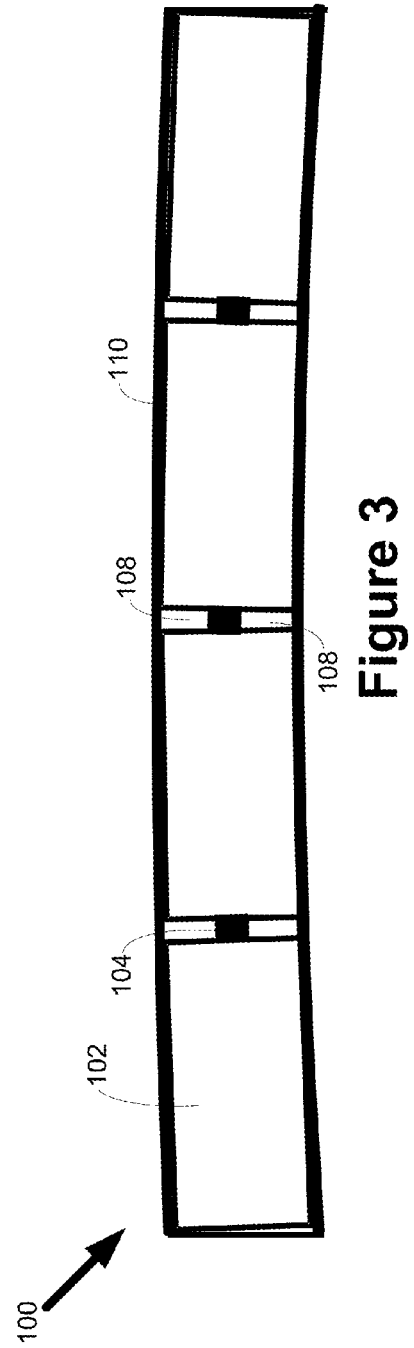

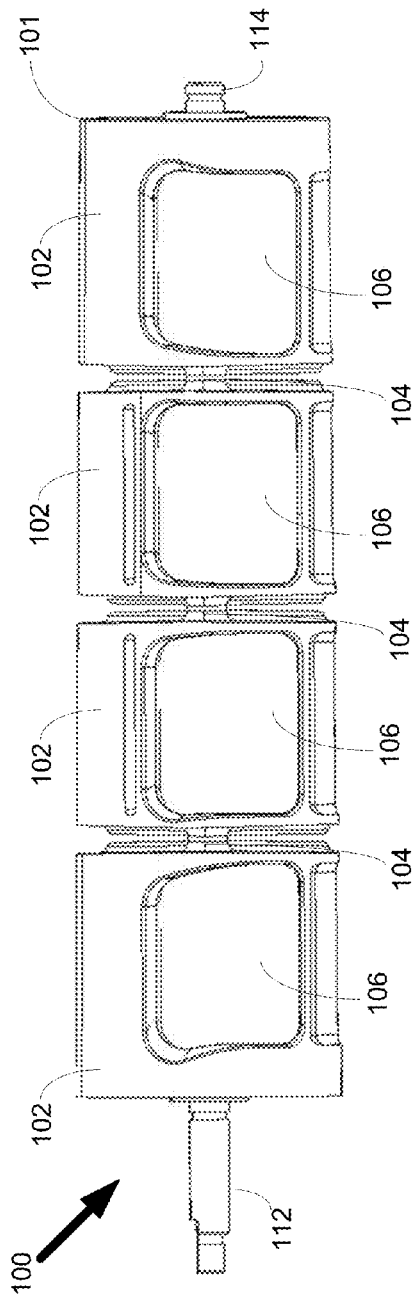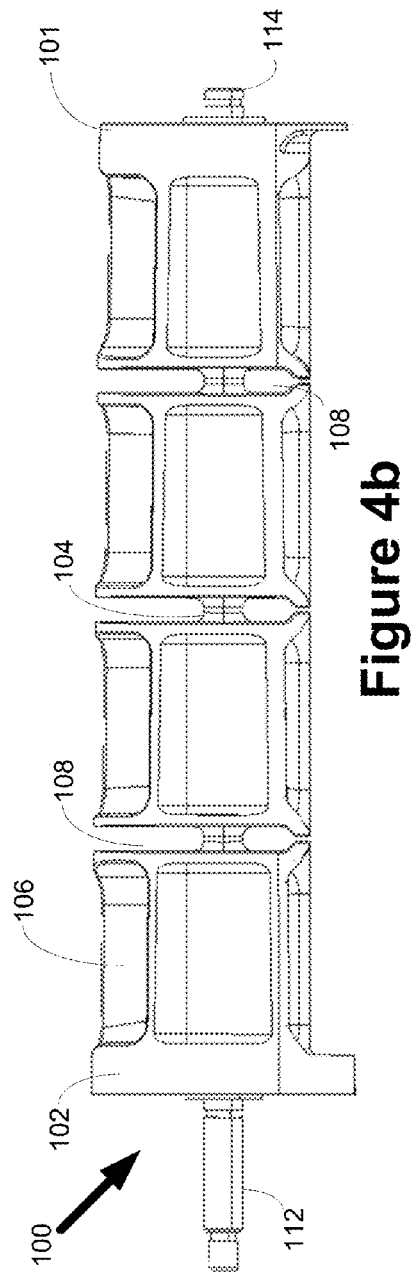

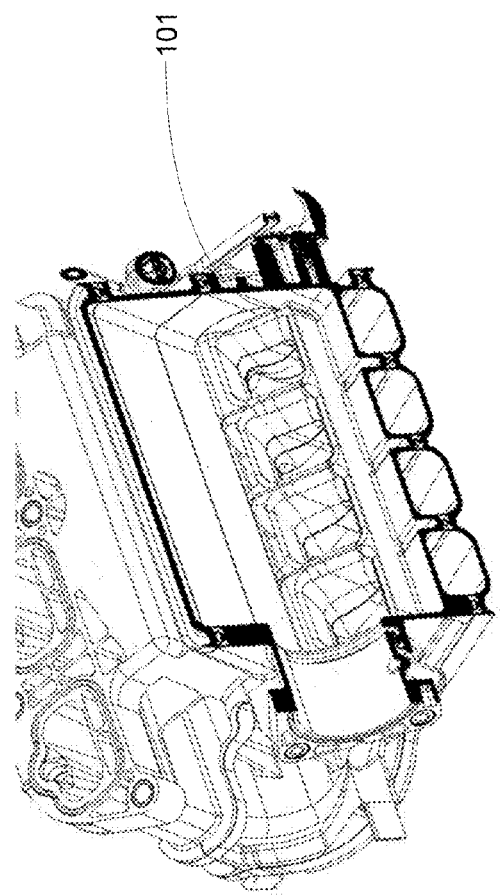
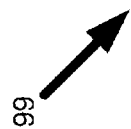
Figure 5b

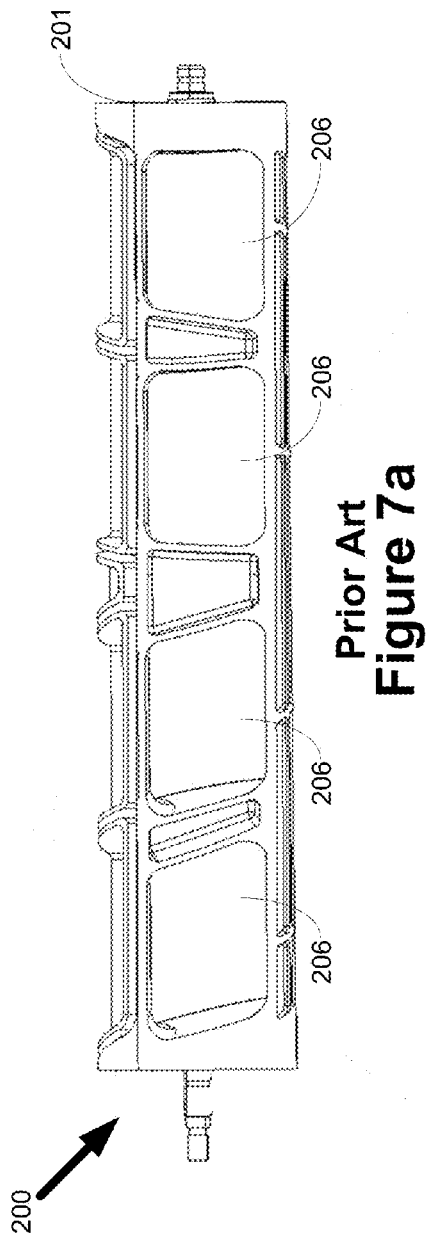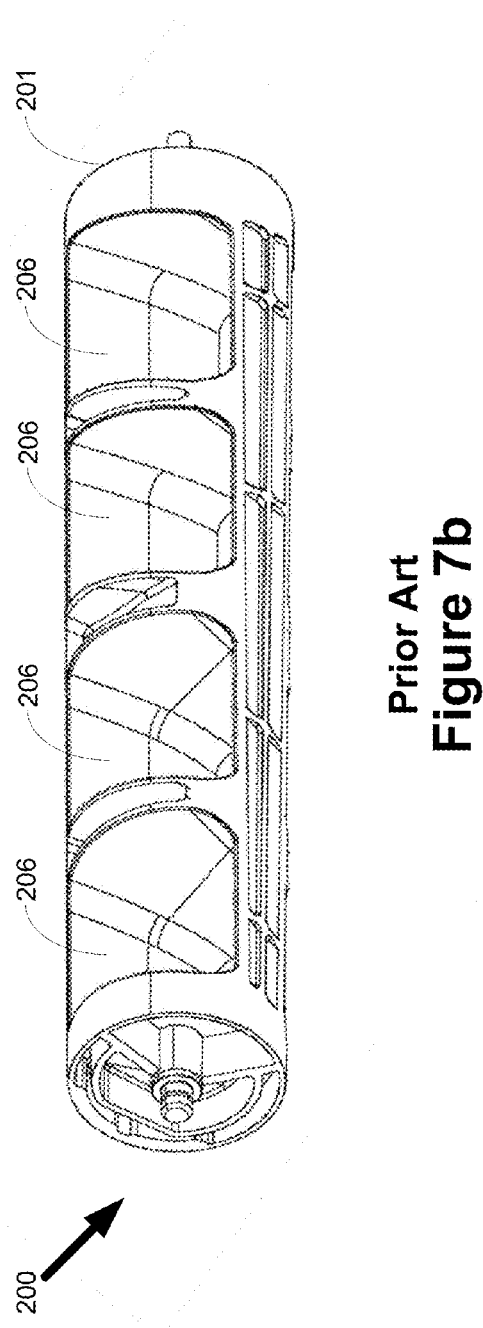
Prior Art
Figure 7a
Prior Art
Figure 7b

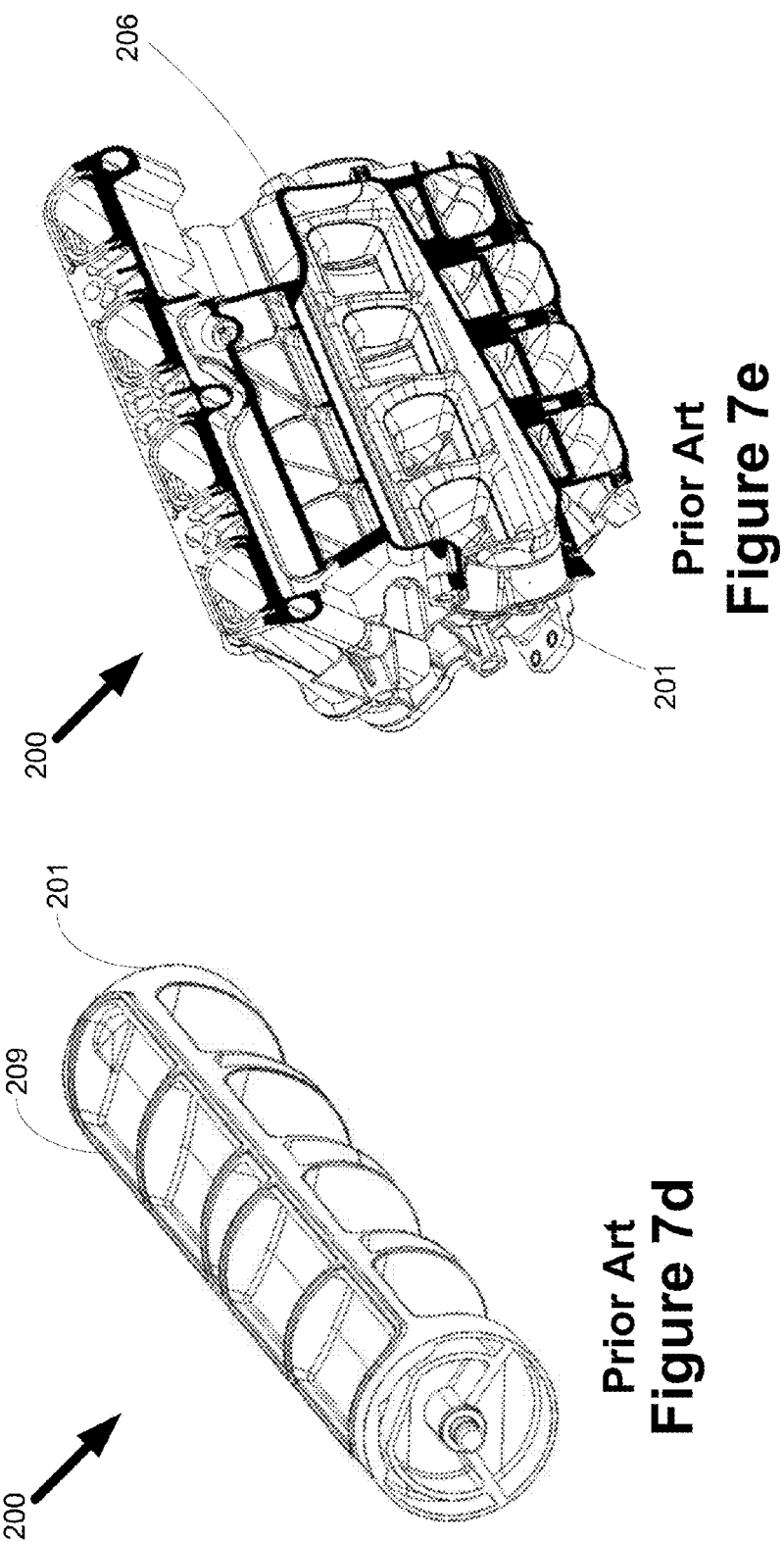

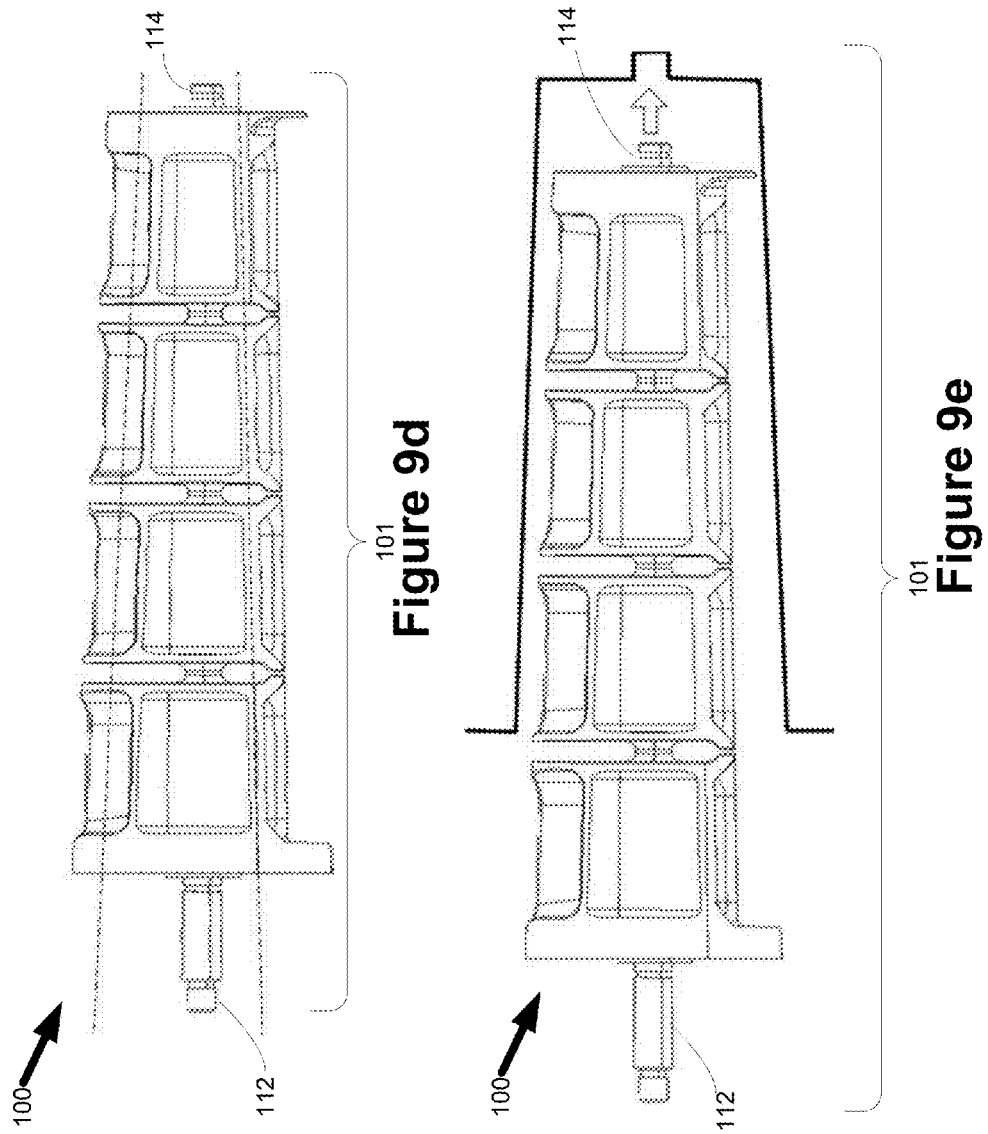

VARIABLE INTAKE SYSTEM AND METHOD

RELATED APPLICATIONS

This U.S. utility patent application claims priority to U.S. provisional patent application titled "VALVE APPARATUS" (Ser. No. 61/346,032) that was filed on May 18, 2010, the contents of which are hereby incorporated by reference in their entirety.

BACKGROUND OF THE INVENTION

The invention relates generally to intake systems and methods. More specifically, the invention is a variable intake system and method (collectively the "system").

Many different types of vehicles use an air intake manifold to direct an air or air-fuel mixture to the engine in such a manner as to enhance the torque generated by the engine. Examples of powered vehicles using air intake manifolds can include but are not limited to automobiles, trucks, motorcycles, airplanes, boats, scooters, go-carts, riding mowers, mobile construction equipment, and other transportation mechanisms powered by an engine (collectively "vehicles"). In addition to transportation applications, air intake manifolds can also be used in the context of powered equipment that does not relate to transportation. Examples of devices utilizing an intake manifold can include but are not limited to lawn mowers, chain saws, forklifts, portable power generators, and other types of powered equipment (collectively "equipment"). The performance of any internal combustion engine can be optimized for improved torque, power, fuel economy or emissions though optimization of the air intake manifold.

There are a wide variety of different embodiments of air intake manifolds. There are also a wide variety of operating environments in which intake manifolds are used. The attributes of the intake manifold can have a significant impact on the efficiency, operation, performance, cost, and other metrics of the engine.

The system can be more fully understood upon reading the summary that is discussed briefly below.

SUMMARY OF THE INVENTION

The invention relates generally to intake systems and methods. More specifically, the invention is a variable intake system and method (collectively the "system").

The system can utilize a rotary valve that enhances one or more metrics of the system. Varying from embodiment to embodiment, the rotary valve can possess enhanced flexibility, be secured without a seal, be positioned within a housing component in such a manner as to enhance the long-term durability of the rotary valve, and/or include a bellmouth opening.

The system can be more fully understood upon reading the accompanying drawings that are discussed briefly below.

BRIEF DESCRIPTION OF THE DRAWINGS

Many features and inventive aspects of the system are illustrated in the following drawings:

FIG. 1a is a block diagram illustrating an example of rotary valve body that can be utilized by the rotary valve apparatus.

FIG. 1b is a block diagram illustrating an example of a close-up view of the rotary valve in FIG. 1a.

FIG. 2 is a block diagram illustrating an example of a rotary valve in a housing component.

FIG. 3 is a block diagram illustrating an example of a rotary valve in a housing component, with both the rotary valve and the housing component illustrating structural flexibility.

FIG. 4a is a diagram illustrating an example of a rotary valve that can be utilized by the system.

FIG. 4b is a diagram illustrating an example of a different view of the rotary valve in FIG. 4a.

FIG. 5b is a isometric section view illustrating an example of the rotary valve from inside the manifold which was displayed in FIG. 5a.

FIG. 7a is a diagram illustrating an example of a prior art rotary valve.

FIG. 7b is a perspective diagram illustrating an example of a prior art rotary valve.

FIG. 7d is a perspective diagram illustrating an example of a prior art rotary valve and a seal.

FIG. 7e is a perspective diagram illustrating an example of a prior art intake manifold.

FIG. 8b is a diagram illustrating a different view of the rotary valve displayed in FIG. 8a.

FIG. 9d is a diagram illustrating an example of a rotary valve with a tapered shape.

FIG. 9e is a diagram illustrating a different view of the rotary valve displayed in FIG. 9d shown within a housing component.

Figure 4C:
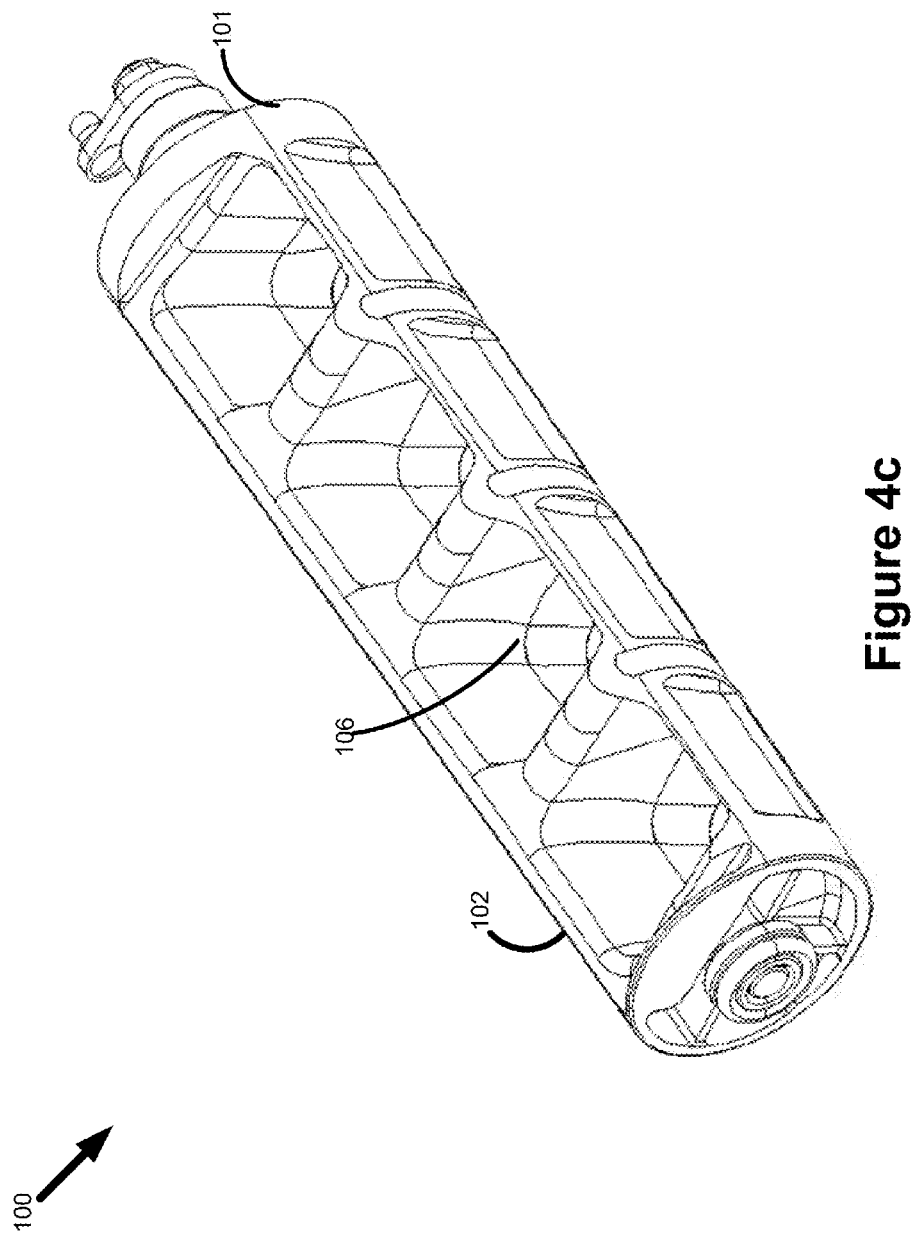
FIG. 4c is an isometric view illustrating an example of a rotary valve that can be utilized by the system.

The system can be more fully understood upon reading the following detailed description.

DETAILED DESCRIPTION

The invention relates generally to intake systems and methods. More specifically, the invention is a variable intake system and method (collectively the "system").

I. Overview

The system can be implemented in a wide variety of different embodiments using a wide variety of different components and different component configurations. The system can be implemented in a wide variety of different operating environments, including vehicles, powered devices, and other implementations.

The system can be implemented to enhance the metrics associated with manifold assemblies. Torque delivered by the engine can be increased. The durability of the rotary valve and related components can be enhanced. Costs can be reduced while at the same time, components can be made easier to manufacture. The system can be implemented to: (a) enhance the flexibility of a rotary valve apparatus: (b) decrease the gap between the rotary valve and the housing component; (c) increase the surface area of the rotary valve that is in direct contact with the housing component; (d) enhance the position of the rotary valve within the housing component for improved durability and noise reduction; (e) include an integrated bellmouth opening in the rotary valve; and/or (f) secure the rotary valve within the housing component without the use of a seal.

The rotary valve apparatus can include a variety of segments and connectors to enhance the flexibility of the apparatus. A rotary valve can be comprised of modular segments divided by interspersed connectors which can provide for greater flexibility than a rotary valve not comprised by segments and connectors. In many embodiments of the apparatus, the diameter of the connector can be substantially smaller than the diameter of the segment. For example the diameter ratios could even exceed 6 to 1 in some embodiments. Flexibility can result in important advantages in terms of durability and in terms of the fit of the apparatus within its housing component (i.e. the portions of the intake manifold that substantially enclose the rotary valve apparatus).

The enhanced flexibility of the rotary valve apparatus can enhance engine performance by reducing the space between the rotary valve apparatus comprised of the segments and connectors and the housing component that houses the rotary valve apparatus. Both the rotary valve apparatus and the housing of the apparatus can accommodate the warping and shrinkage of both parts by enhancing the flexibility of the member in the radial direction. The enhanced fit of the member within the housing component can result in better sealing between the rotary valve apparatus (i.e. the valve body) and the housing, and prevent rattling of the rotary valve apparatus within the housing. The plastic injection molding process can be used to create thermoplastic components including rotary valves that will often result in a certain amount of warping and shrinkage. The design of the rotary valve apparatus can address those realities of the manufacturing process. In prior art valves, the gap between the rotary valve and housing component (what is defined below as an "external gap" because the gap is not per se the result of the internal geometry of segments and connectors making up the rotary valve body) can result in significant engine performance drop and rattling by the valve against the housing.

The external gap between a valve (which can also be referred to as a member, a valve body, a barrel valve, or a rotary valve) and its corresponding housing component (which can also be referred to as a housing or shell) can result in significant performance problems regardless of whether the valve is open, closed, or some state in between. Leaks within the air intake manifold runner passage due to external gaps between the rotary valve and the housing can be particularly problematic due to the reduction of acoustic tuning.

The rotary valve apparatus can include a valve body (made up of segments and connectors) and a housing component. The valve body and housing component can be tapered to enhance the function of the rotary valve apparatus without requiring that the rotary valve apparatus include a seal, such as a gasket or elastomeric material. The tapered shape of the valve body (which can also be referred to as a valve member) and the housing component can minimize the space between the valve body and the housing component (space that is defined below as the "external gap"). Use of a tapered valve body in conjunction with a tapered housing component can enlarge the contact area between the two bodies, minimizing the wear, rattling and warping that can result from strongly concentrated contact by two independent bodies. O-rings, springs, and other elastomeric components can be used on or both horizontal ends of the apparatus to better secure the horizontal position of the valve body within the housing component.

II. Introduction of Elements and Definitions

FIG. 1a is a block diagram illustrating an example of rotary valve apparatus 100 that can be incorporated into a variable intake system and method used in conjunction with a engine in a device such as a vehicle (collectively the "system" 99).

A. System

Figure 5A:
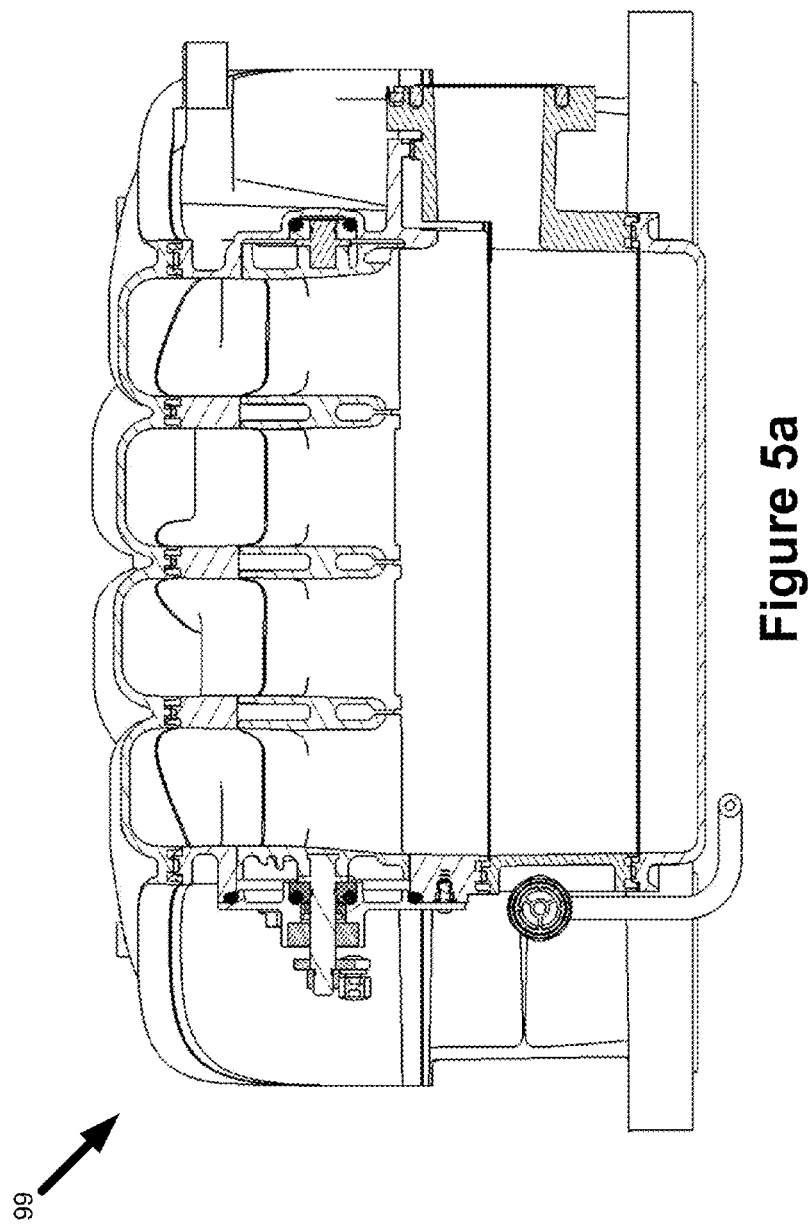
FIG. 5a is section view illustrating an example of a rotary valve within an air intake manifold.

The system 99 is comprised of the rotary valve apparatus 100, and all other components of the intake manifold. Partial examples of the system 99 are illustrated in FIGS. 5a and 5b. The system 99 can include a wide variety of different operating contexts for an engine utilizing a intake manifold. Many but not all embodiments of the system 99 will involve a powered vehicle.

B. Rotary Valve Apparatus

Returning to FIG. 1a, a rotary valve apparatus 100 (which can also be referred to simply as the "apparatus" 100) is the component within the system 99 that provides the ability to modify the performance of the engine. Some embodiments of the system 99 provide for two distinct, binary, and non-linear states, the state of the apparatus 100 being fully open and the state of the apparatus 100 being fully closed. In other embodiments, the status of the rotary valve apparatus 100 is linear/incremental, with the ability to incrementally move towards a fully open rotary valve apparatus 100 or a fully closed rotary valve apparatus 100. In many modern embodiments, the rotary valve apparatus 100 is typically controlled by the computer processor for the engine and is actuated by either a vacuum-based or electrical-based power source.

The rotary valve apparatus 100 can be comprised of a wide range of different materials and components organized in a wide variety of different configurations. The rotary valve apparatus 100 is often substantially cylindrical in shape, and thus can also be referred to as a barrel valve apparatus 100.

The different components of the rotary valve apparatus 100 can include a rotary valve body 101 (which can also be referred to as a rotary valve member 101), a housing component 110, and a variety of other components.

C. Rotary Valve Body (Rotary Valve Member)

As illustrated in FIG. 1a, the rotary valve apparatus 100 can include a rotary valve body 101 (which can also be referred to as a rotary valve member 101). The rotary valve body 101 can be comprised of segments 102 and connectors 104. Different embodiments of the rotary valve body 101 can be of different shapes, dimensions, geometries, and material compositions. Different rotary valve bodies 101 can also include a wide variety of different segment 102 and connector 104 configurations.

D. Segments

As illustrated in FIG. 1a, the rotary valve body 101 can be comprised of one or more segments 102 and one or more connectors 104. In the illustration of FIG. 1a, there are four segments 102 separated by three connectors 104, but a wide variety of different configurations are possible. In many embodiments, the number of segments will be equal to the number of cylinders in a combustion engine although other configurations are possible.

In some embodiments, two or more connectors 104 could be adjacent to each other and two or more segments 102 could be adjacent to each other. In many embodiments, the segments 102 are comprised of some type of plastic. Segments 102 can be configured in a variety of different shapes, and in many embodiments, are substantially cylindrical in shape.

E. Connectors

A connector 104 can be positioned between every two segments 102 in some embodiments of the system 99. Connectors 104 are often comprised of some type of plastic, and can be comprised of the same material as the segments 102. The geometric attributes of the connectors 104 interspersed among the sequential series of segments 102 can be one of the means by which the rotary valve apparatus 100 is made flexible. The material composition of the connectors 104 can also enhance the flexibility of the body 101 and the apparatus 100. The geometry and dimensions of the connectors 104 can potentially vary even more widely than those of the segments 102 because the purpose of the connectors 104 is to impact the flexibility of the valve body 101 and valve apparatus 100. Different magnitudes of flexibility can be achieved through variations in the connectors 104. Unlike the segments 102 (which house the openings 106 in the rotary valve body 101 that enable the apparatus 100 to function as a valve), the primary purpose of the connectors 104 is typically to implement the desired magnitude of flexibility or desired magnitude of stiffness in the rotary valve body 101 and apparatus 100. The connectors 104 may in some embodiments be comprised of an even more flexible material than the segments 102 because the segments 102 may be constrained to some degree by the need for openings 106 of fixed dimensioning requirements.

In embodiments of the system 99 with substantially cylindrical segments 102 and connectors 104, the segments 102 will typically have larger diameters than the connectors 104. In some embodiments, the difference in diameters is in orders of magnitude such as 3 times larger or even up to about 5 or 6 times as large. In an embodiment of the system 99 where the diameter of one or more segments 102 is materially greater than the diameter or one or more connectors 104, the distance between the housing component 110 and one or more connectors 104 can be materially greater than the distance between the housing component and one or more segment 102.

F. Openings

Each rotary valve body 101 can include one or more openings 106. An opening 106 is the mechanism by which the rotary valve body 101 performs the function of a valve. Rotation of the rotary valve body 101 within the housing 110 can result in an "open valve" status for the system 99 or a "closed valve" status for the system 99. The openings 106 are located within the segments 102 and can be configured in a wide variety of different geometries and dimensions so long as the openings 106 allow for the passage of air or a combination of fuel-air through the opening 106 when the system 99 is in a state of "open valve", i.e. the opening must allow for the air or air-fuel mixture to enter in from one side and exit out the other side. In many embodiments of the system 99, the opening 106 will be specifically shaped to enhance the torque generated by the engine. For example, the openings 106 could utilize a trumpet-shaped bellmouth 186 as illustrated in FIG. 10b. Such trumpet-shaped bellmouths 186 can be integrated directly (i.e. molded into) the openings 106 of the rotary valve body 101. Bellmouth shaped openings 106 are also illustrated in FIG. 4c.

G. Gaps

A gap is a three dimensional space defined by the applicable contextual component. In a two-dimensional drawing, a gap illustrated as a two dimensional area. There are different types of gaps that can be material to the system 99.

1. Internal Gaps

An internal gap 108 is the spacing created by the difference in the relatively larger diameters of the segments 102 and the relatively smaller diameter of the connectors 104. Internal gaps 108 can have a significant impact on the flexibility and durability of the rotary valve body 101, as well as the apparatus 100.

The geometry of the gaps 108 can be impacted by the differences between segments 102 and connectors 104 in terms of shapes and sizes. In FIG. 1a, a series of gaps 108 are illustrated both vertically above and vertically below each connector 104. The geometry of the apparatus 100 can impact the vertical gaps 108 between the apparatus 100 and the housing component 110. Gaps 108 include the space resulting from connectors 104 being smaller in size than the segments 102 connected by the connectors 104. In some embodiments, flexibility created by the gap 108 may need to be reduced locally at one or multiple connectors 104, depending upon the requirements of the design and the physical environment that the system 99 resides within. FIG. 1b is a block diagram illustrating an example of a zoomed-in close-up view of the rotary valve body 101 in FIG. 1a.

2. External Gaps

Figure 9A:
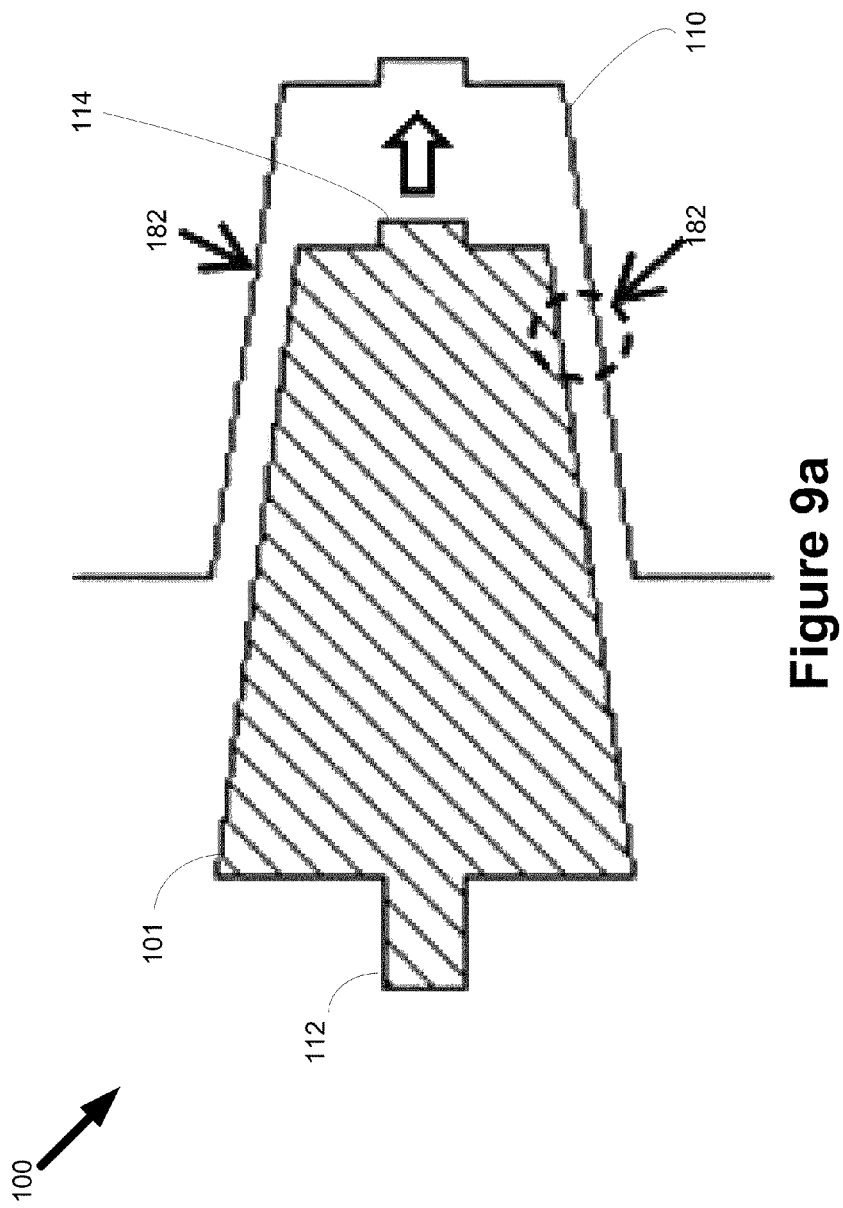
FIG. 9a is a block diagram illustrating an exaggerated example of a rotary valve with a tapered exterior housing and how the housing has been tapered to match the rotary valve.
Figure 9B:
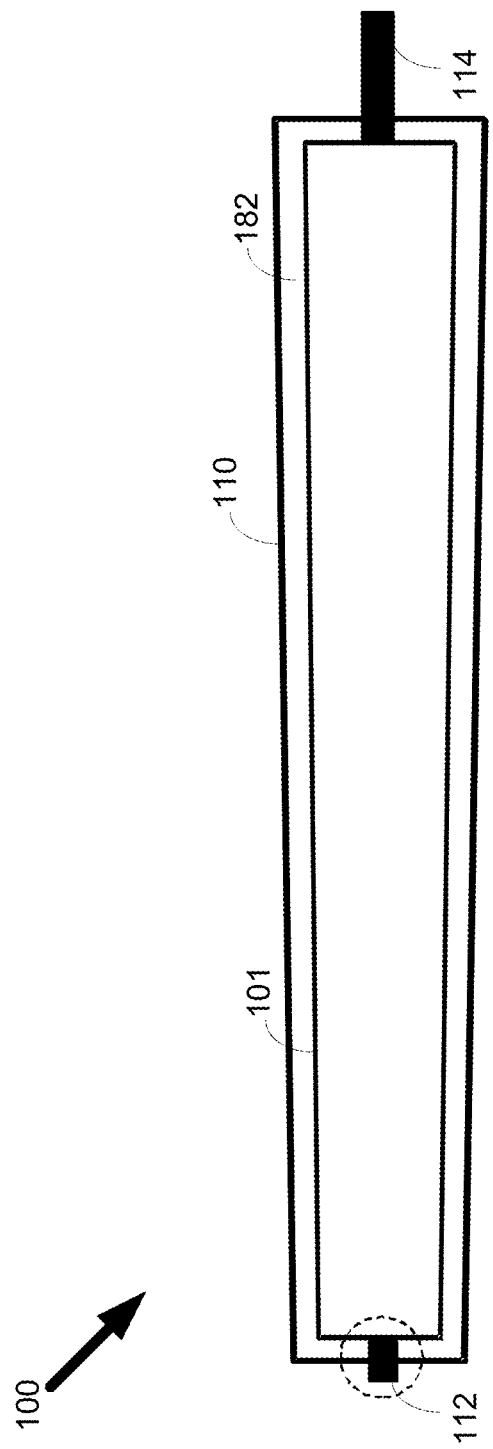
FIG. 9b is a block diagram illustrating an example a rotary valve and a housing component with tapered dimensions.

FIGS. 9a and 9b illustrate examples of an external gap 182. An external gap 182 is the spacing between the rotary valve 101 and the housing component 110. The geometry and dimensions of different external gaps 182 can impact the tuning and/or acoustical aspects of the system 99, which in turn can impact the efficiency and durability of the system 99. External gaps 182 are impacted by the tightness of the clearance fit between the valve body 101 and the housing component, 110. The external gaps can be reduced by permitting the valve body to increase in size (usually diameter) until the valve body nearly approaches the housing component cylindrical inside diameter. With a valve body with flexible components, this gap can be reduced, as even if contact occurs between the valve body and the housing component, the associated friction at this interface can be relatively low due to the flexibility of the valve body.

The system 99 can be implemented in such a manner as to minimize the external gaps 182 between the segments 102 and the housing component 110 while using relatively larger internal gaps 108 between the connectors 104 and the housing component 110 to tune the system 99.

Different embodiments of the system 99 can incorporate connectors 104 and segments 102 of different shapes and sizes, and thus internal gaps 108 can be implemented in a wide variety of different shapes and sizes.

H. Housing Component

FIG. 2 is a block diagram illustrating an example of the apparatus 100 that includes a rotary valve body 101 (comprised of four segments 102 and three connectors 104) and a housing component 110. The housing component 110 is the portion of the intake manifold assembly that houses the rotary valve body 101, permits the movement of the body 101 within it, and (in conjunction with the openings 106 in the body 101) performs the function of a valve that can be open or closed. In some embodiments, some states in between fully open and fully closed are also possible.

A wide variety of different rotary valve body 101 and housing components 110 configurations are possible, so long as the fit of the body 101 within the housing 110 is such that in combination, the functionality of an intake valve is provided to the system 99. In a fully closed state, the openings 106 of the rotary valve body 101 are covered by the housing component 110 to provide a "closed" state. In a fully open state, the openings 106 of the rotary valve body 101 are fully exposed in order to permit the flow of air or an air-fuel mixture. The housing component 110 provides the ability to at least partially enclose the rotary valve body 101 within it.

I. Fit

The term "fit" is used to describe the positioning of the rotary valve body 101 within the housing component 110. As discussed in greater detail below, the fit of the rotary valve body 101 within the housing 110, the flexibility of the apparatus 100, and the means by which the rotary valve body 101 is secured within the housing 110 can have important ramifications with respect to the flexibility, durability, and efficiency of the system 99.

FIG. 3 is a block diagram illustrating an example of a rotary valve apparatus 100 in a housing component 110, with both the rotary valve 101 and the housing component 110 illustrating structural flexibility while sustaining a tight fit between the two components. This tight fit usually permits the exterior gap 182 to be minimized which has performance and durability benefits. As discussed below, such flexibility can also be desirable because warping of plastic components involved in the system 99 can be inevitable. The fit of the rotary valve body 101 within the housing component 110 can be impacted by the components on both ends of the rotary valve body 101.

J. End Components

FIG. 4a is a diagram illustrating an example of a rotary valve apparatus 100 that can be utilized by the system 99. Included in the illustration are a shaft-threaded end 112 and a shaft-blind end 114. The changing of the operating state of the valve from open to closed, closed to open, or from some state to another state, involves rotating the rotary valve body 101 around the shaft-threaded end 112 and the shaft-blind end 114. As discussed below, the two ends 112 and 114, in conjunction with a tapered shape of the rotary valve body 101 and other components shown in FIG. 6A (discussed in the next section), serve to mitigate against rattling and other noise in the axial direction.

FIG. 4b is a diagram illustrating an example of a different view of the rotary valve body 101 displayed in FIG. 4a.

K. Rotary Valve Assembly

Figure 5C:
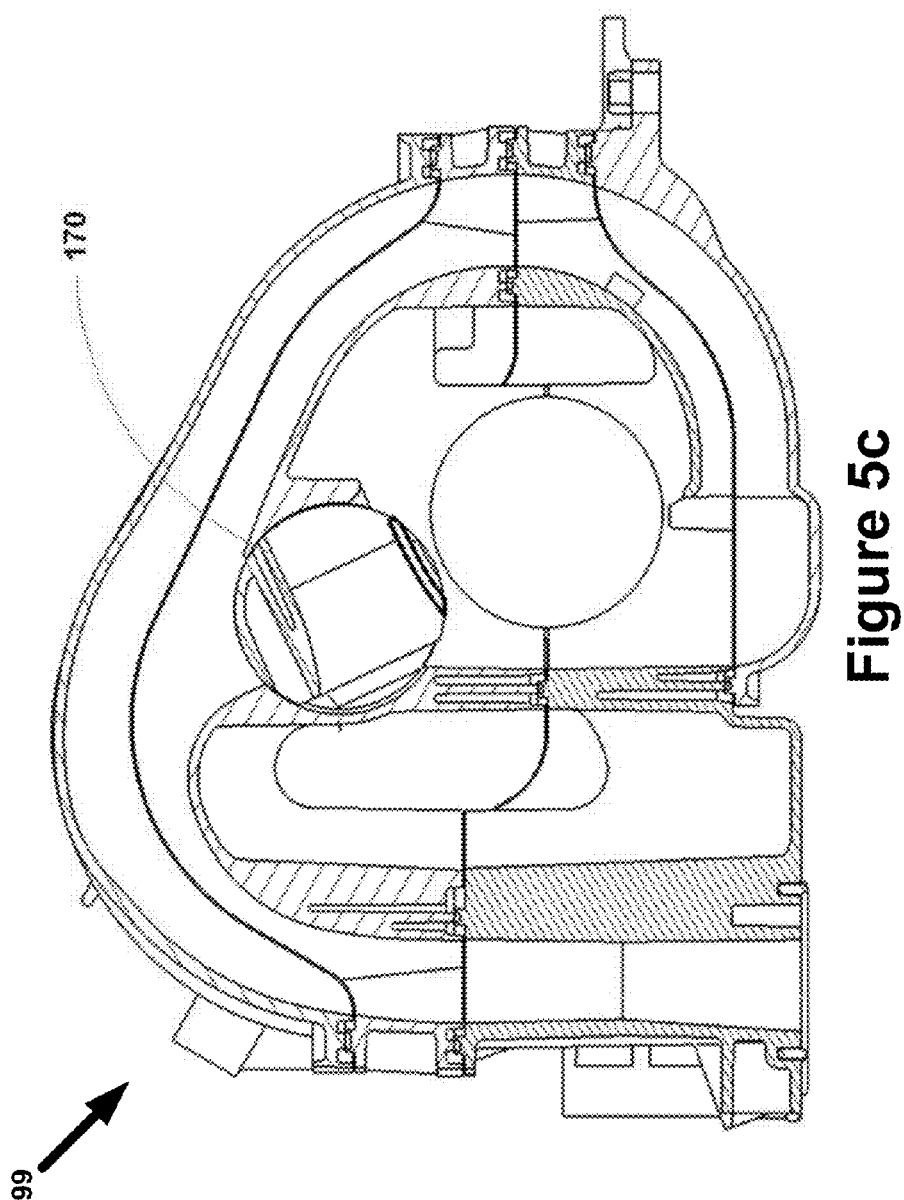
FIG. 5c is a section view illustrating a different view of the intake system displayed in FIG. 5a and FIG. 5b.

Many embodiments of the system 99 will utilize a rotary valve apparatus 100 in conjunction with a potentially wide variety of additional components. Collectively the rotary valve apparatus 100 and those additional components can be referred to as a rotary valve assembly 170. A wide variety of additional components can be utilized by the system 99 to enhance the desired operating parameters and performance metrics of the system 99. FIG. 5a is diagram illustrating an example of an intake system. FIG. 5b is a perspective diagram illustrating a different view of the intake system displayed in FIG. 5a. The openings 106 of the rotary valve body 101 are visible in FIG. 5b. FIG. 5c is a diagram illustrating a different view of the intake system displayed in FIG. 5a and FIG. 5b. In FIG. 5c, the location of the rotary valve assembly 170 is visible.

Figure 6A:
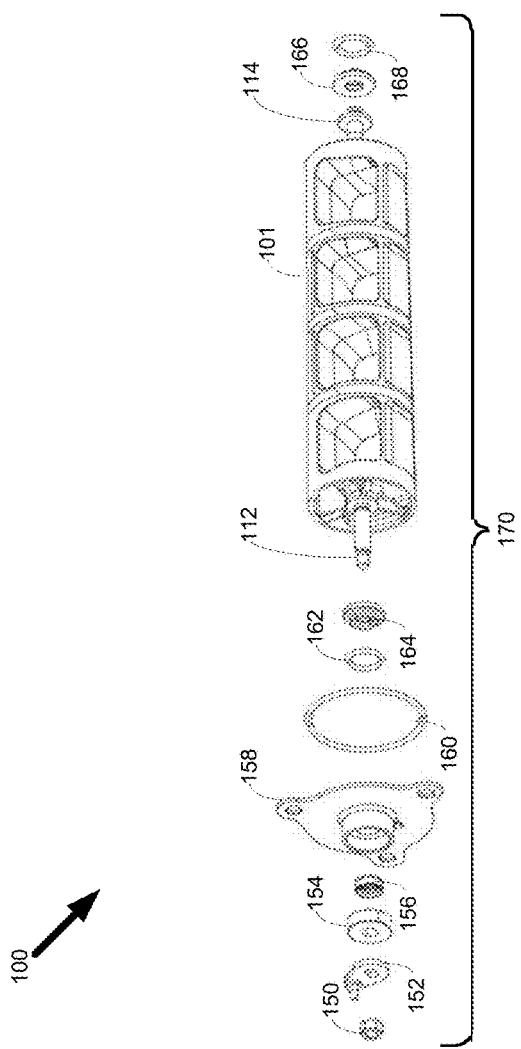
FIG. 6a is an exploded view illustrating an example of different components that can be incorporated into a rotary valve assembly.

FIG. 6a is an exploded view illustrating an example of different components that can be incorporated into a rotary valve assembly 170 of the apparatus 100. To the right side of the rotary valve body 101 and the shaft-blind end 114 are a bushing 166 and an o-ring 168. To the left side of the rotary valve body 101 and the shaft-threaded end 112 is a bushing 164, an o-ring 162, a large o-ring 160, a cap 158 (which can also be referred to as a variable intake system cap or VIS cap), a vacuum seal 156, a bearing 154, a lever 152 (which can also be referred to as a VIS lever) and a nut 150 (such as for example, an M6 nut).

Figure 6B:
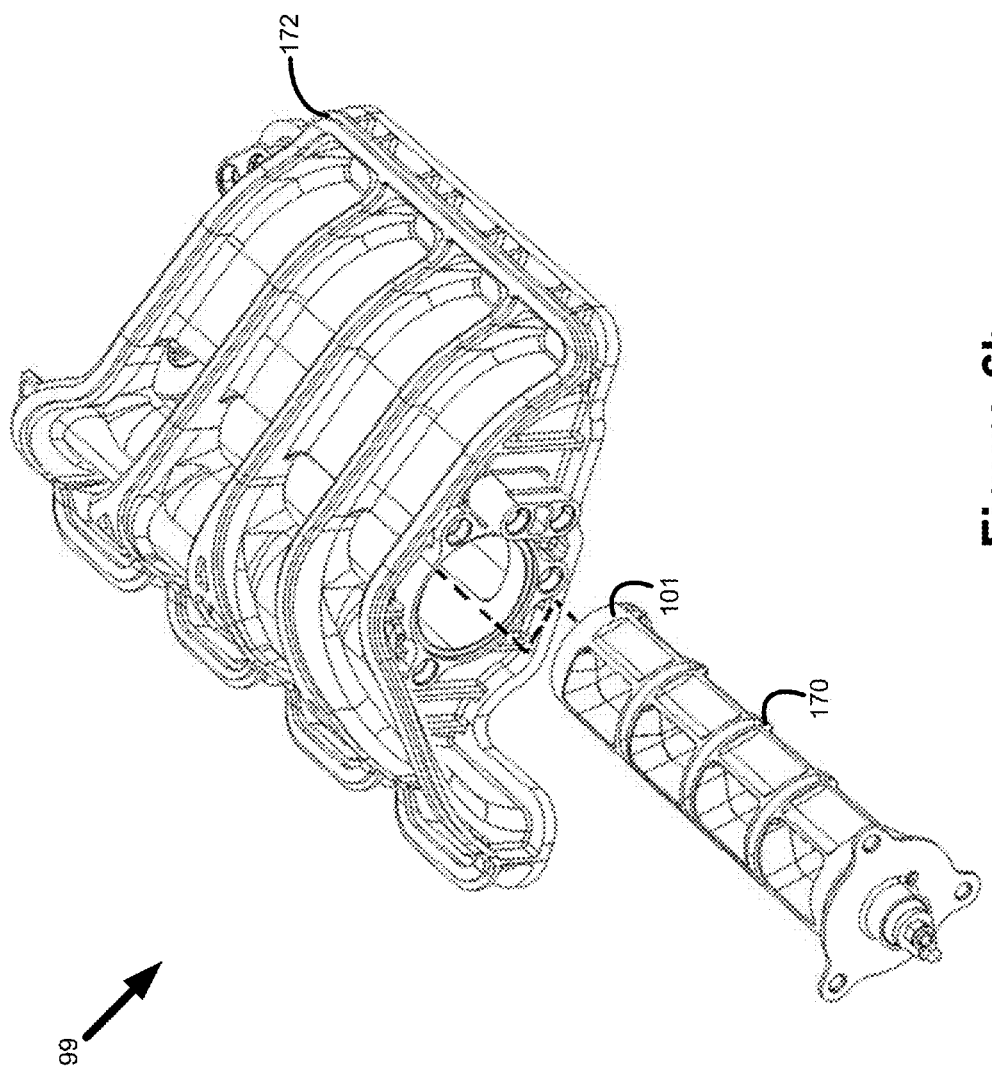
FIG. 6b is an isometric view illustrating an example of a rotary valve assembly and a shell that can be incorporated into the system.

FIG. 6b is a perspective diagram illustrating an example of a rotary valve assembly 170 and a shell 172 (which includes the housing component 110) that can be incorporated into the system 99. The shell 172 can also be referred to as center shell 172 since the shell 172 illustrated in FIG. 6b is configured to be positioned underneath an upper shell and above a lower shell.

III. Prior Art Rotary Valves and Intake Manifolds

Some features of some embodiments of the system 99 can be more effectively illustrated by contrasting such attributes with the prior art attributes.

FIG. 7a is a diagram illustrating an example of a prior art rotary valve 201 used in a prior art intake manifold 200. The prior art valve 201 is not comprised of a modular structure of discrete segments 102 and connectors 104, but is instead comprised of a singular whole member with openings 206. The shape of those openings 206 is better illustrated in FIG. 7b. While in some prior art rotary valves segments have been split by features that may have the appearance of connectors, these connectors have generally only been identified as for material reduction or for addition of separate radial sealing members. An example of such a design can be found in U.S. Pat. No. 6,889,649.

FIG. 7b is a perspective diagram illustrating an example of a prior art rotary valve 201. As can be seen in the illustration, the prior art openings within the rotary valve 201 are not trumpet-shaped. Prior art rotary valves 201 typically utilize bellmouth shaped geometry integrated to or attached to the housing component for the valve 201 in order to enhance the torque of the engine.

Figure 7C:
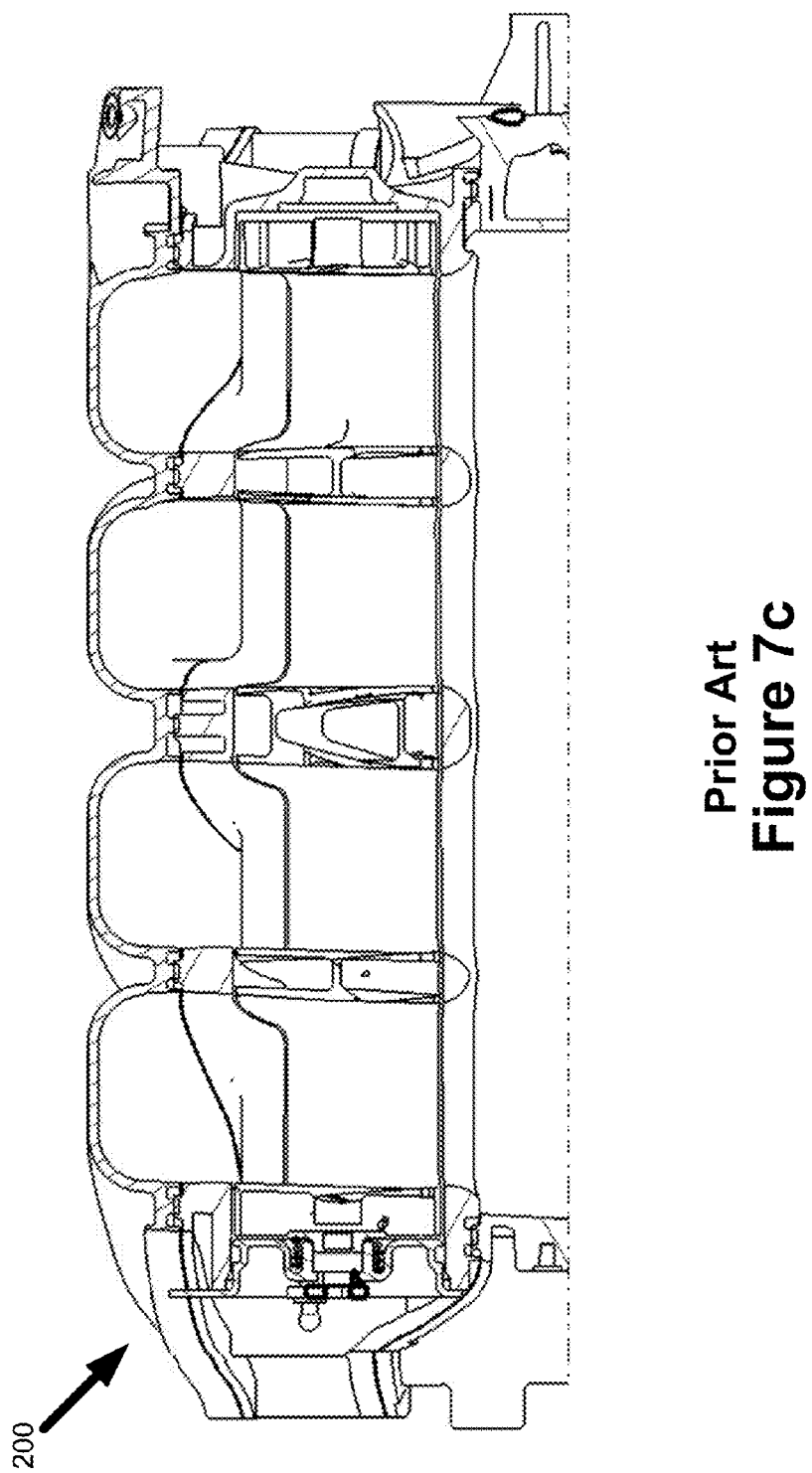
FIG. 7c is a diagram illustrating an example of a prior art intake manifold.

FIG. 7c is a diagram illustrating an example of a prior art intake manifold 200 that serves as a contrast with the system 99 illustrated in FIG. 5a.

FIG. 7d is a perspective diagram illustrating an example of a prior art rotary valve 201 and a seal 209. As discussed above and below, the rotary valve apparatus 100 of the system 99 does not require the use of a seal 209 because the fit of the apparatus 100 within the housing component 110 is sufficiently secure that no seal 209, or any form of gasket or elastomeric component is required.

FIG. 7e is a perspective diagram illustrating an example of a prior art intake manifold 200.

Figure 7F:
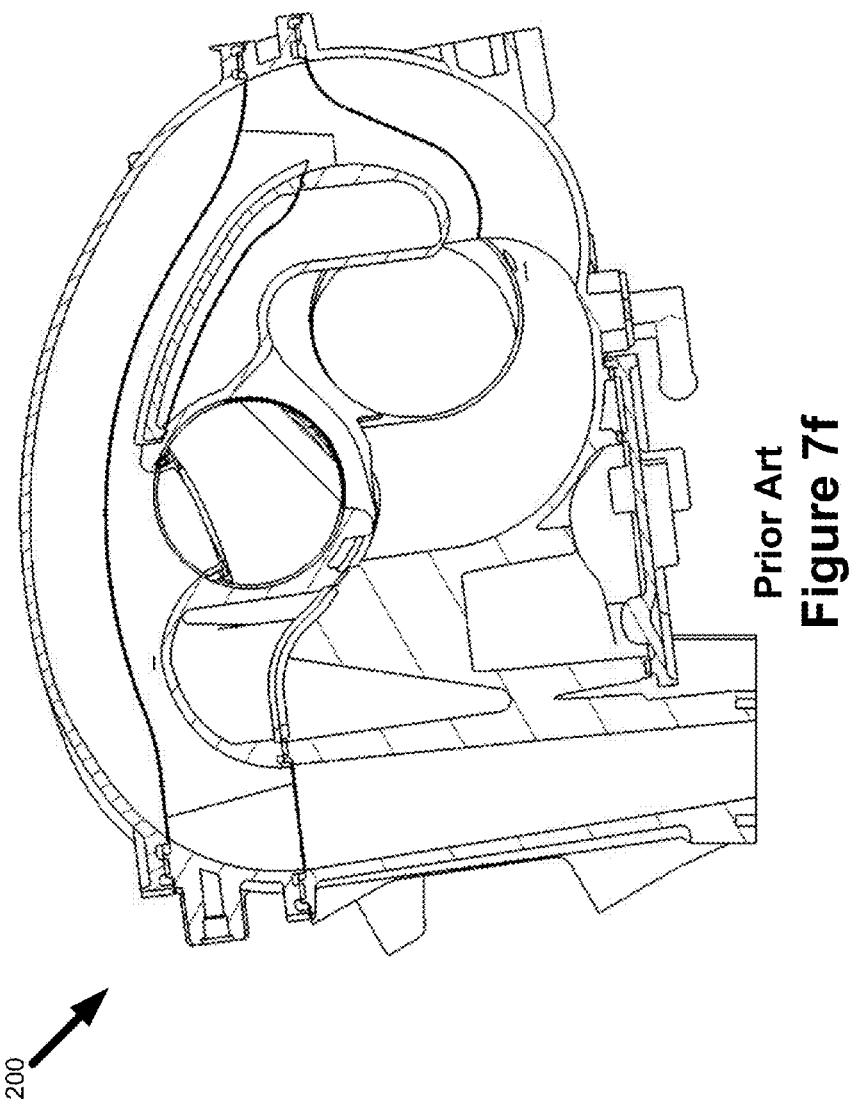
FIG. 7f is a diagram illustrating an example of a prior art intake manifold.

FIG. 7f is a side view diagram illustrating an example of a prior art intake manifold 200.

IV. Flexibility of the Rotary Valve Apparatus

The system 99 can be configured in such a manner as to enhance the flexibility of the rotary valve body 101 within the housing component 110. The flexibility of the rotary valve body 101 is achieved through the structure of connectors 104 interspersed between segments 102 or sequences of segments 102. Segments 102 can be comprised of different material than the connectors 104, which can facilitate flexibility. Different geometric configurations with respect to internal gaps 108 can also facilitate flexibility.

Such flexibility can result in performance, durability, and cost benefits. Making the rotary valve apparatus 100 flexible allows the apparatus 100 to absorb or accommodate the warping of the housing component 110 (which can also be referred to as a shell).

Figure 8A:
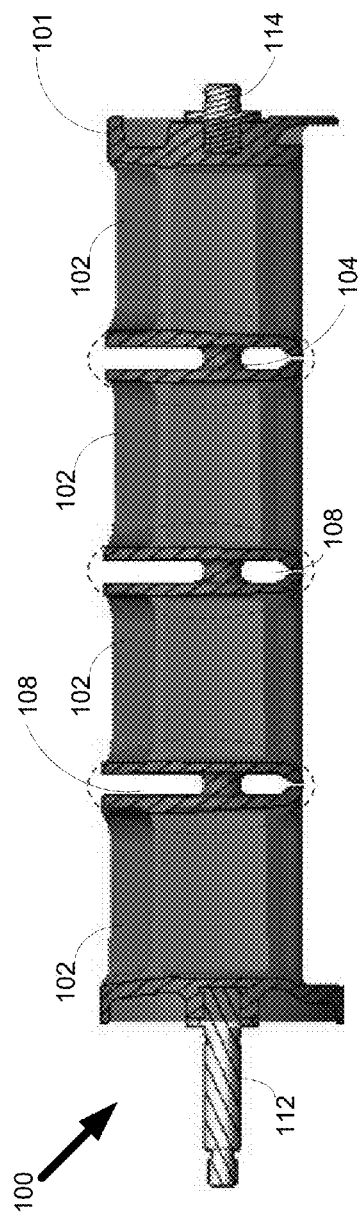
FIG. 8a is a diagram illustrating an example of a rotary valve that can be incorporated into the system.

FIG. 8a is a diagram illustrating an example of a rotary valve apparatus 100 that can be incorporated into the system 99. As illustrated in the Figure, the diameter of the connectors 104 is far smaller than the diameter of the segments 102, resulting in internal gaps 108 both above and below the connectors 104. As discussed previously, the internal gaps 108 for one or multiple segments may be minimized, supported locally by another feature, or completely eliminated depending upon fit and flexibility requirements, however, in general the internal gaps are maintained for optimization of flexibility of the system 99.

Figure 8B:
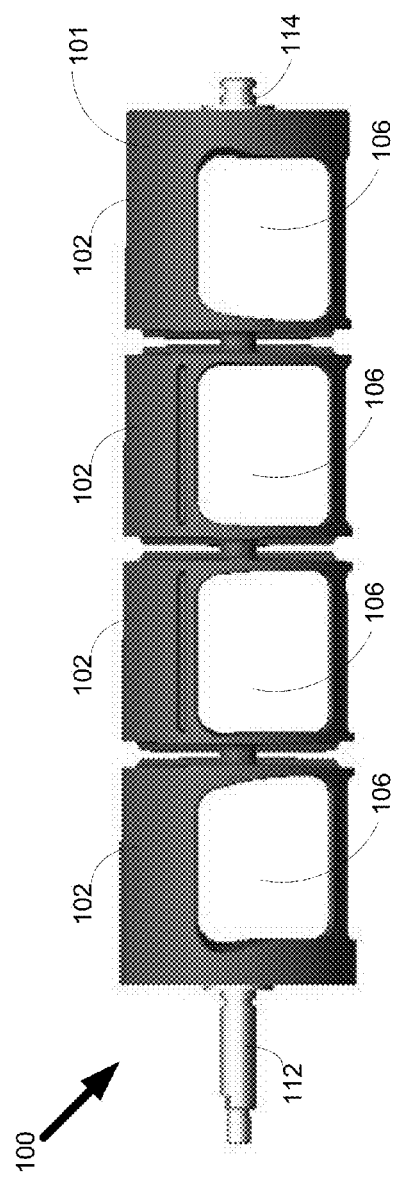

FIG. 8b is a diagram illustrating a different view of the rotary valve apparatus 100 displayed in FIG. 8a.

Figure 8C:
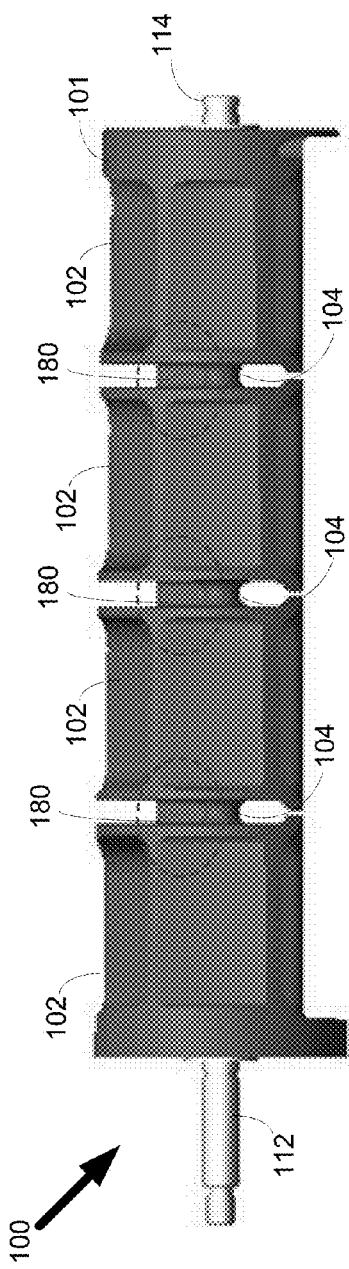
FIG. 8c is a diagram illustrating an example of a rotary valve that includes a brace to stiffen the rotary valve.
Figure 8D:
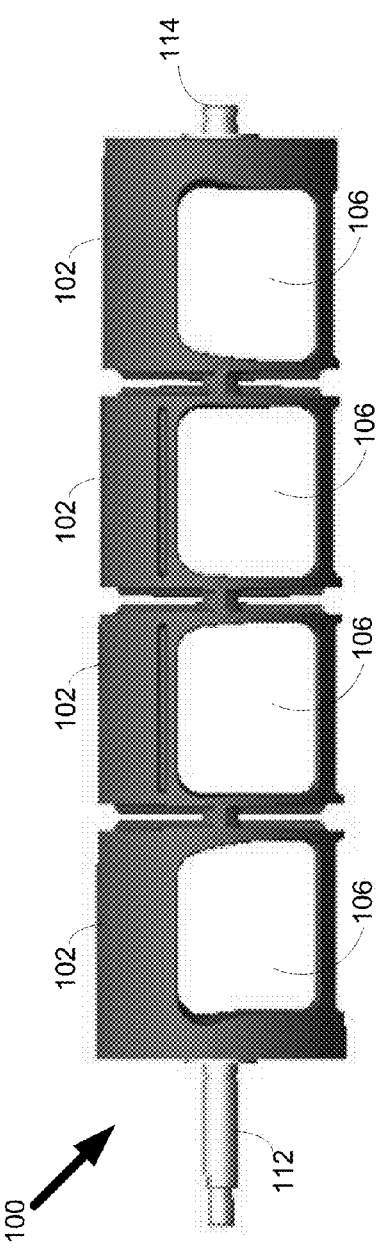
FIG. 8d is a diagram illustrating a different view of the rotary valve displayed in FIG. 8c.

FIG. 8c is a diagram illustrating an example of a rotary valve that includes a brace 180 to stiffen the rotary valve body 101 apparatus 100 if maximum flexibility is not desired for whatever reason. The shape, size, and material composition of the brace 180 allows different embodiments to implement the desired magnitude of flexibility, as well as to influence and shape the direction and geometry of that flexibility. FIG. 8d is a diagram illustrating a different view of the rotary valve displayed in FIG. 8c.

The flexibility of the rotary valve apparatus 100 can be beneficial in its own right. However, it is also potentially beneficial when taking the fit between the body 101 and the housing component 110 into consideration.

V. Fit of the Rotary Valve Body with the Housing Component

The flexibility of the rotary valve body 101 allows the apparatus 100 to obtain uniform sealing performance without the use of a prior art seal 209 or some other form of gasket or elastomeric component. The flexibility of the rotary valve body 101 enhances the "fit" of the body 101 within the housing component 110. The flexibility of the rotary valve apparatus 100 (which can also be referred to as an intake manifold runner length switching device) permits function to be improved and cost to be minimized by reduction of the external gaps 182 between the segments 102 and housing component 110 through elimination of the seal 209. The external gap 182 between the segments 102 and the housing component 110 is reduced while at the same time the internal gap 108 between the connectors 102 and the housing component 100 is increased for flexibility purposes.

The flexibility of the rotary valve apparatus 100 can enhance the sealing of the apparatus 100 in both open and closed positions. The flexibility of rotary valve apparatus 100 is particularly useful along the rotational/longitudinal axis. The rotary valve apparatus 100 allows tight juxtaposition of the apparatus 100 to the housing component 110 within the shell 172 due to the provided compliance of the rotary valve apparatus 100.

When the system 99 is an open state, the close proximity of the intake manifold shell (i.e. the housing component) 110 to the rotary valve apparatus 100 enables individual intake manifold runner passages within the barrel valve apparatus 100 to be sufficiently sealed from adjacent passages due to the tight fit between the barrel valve body 101 and the housing component 110 which permits a torturous flow path between adjacent passages which impedes the flow of air between adjacent passages and helps to make the flow path through opening 106 to be sufficiently leak (air and/or acoustics) resistant to meet the required engine performance expectations. This helps to avoid reduction of engine performance due to the intake manifold's runners from unintentionally communicating pressure pulsations with adjacent runners which could cause the customer targeted engine performance not to be met.

When the system 99 is in a closed stated, the sealing of the barrel valve apparatus 100 to the housing component 110 (i.e. the interior portions of the intake manifold runner interior that house the apparatus 100) is critical to ensure that engine performance enabled by the long-passage length of the runner is not sacrificed. Prior embodiments rely on the use of either additional seal components 209, including, but not limited to, gaskets or elastomeric components, to ensure that sufficient sealing is maintained during valve closed operation occurrences to meet the required engine performance expectations.

Figure 9C:
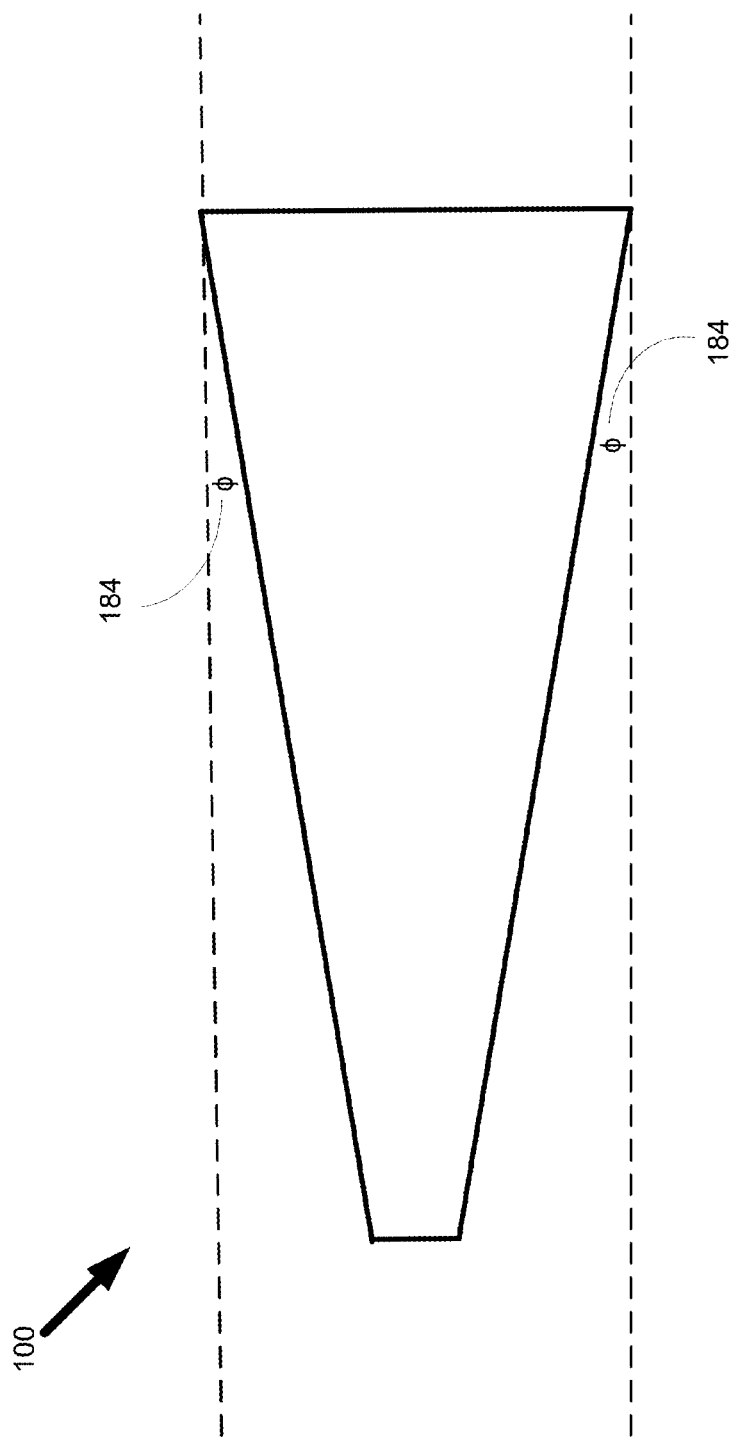
FIG. 9c is a block diagram illustrating an exaggerated example of a taper angle.
Figure 9F:
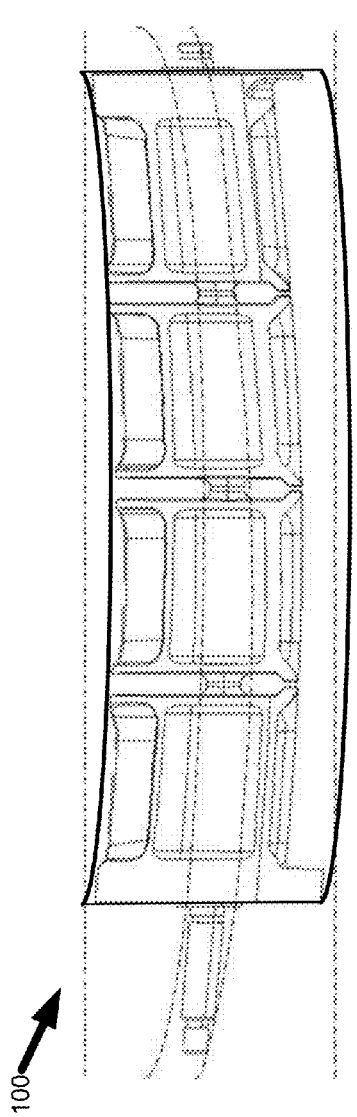
FIG. 9f is a diagram illustrating an example of the flexibility of a rotary valve.
Figure 9G:
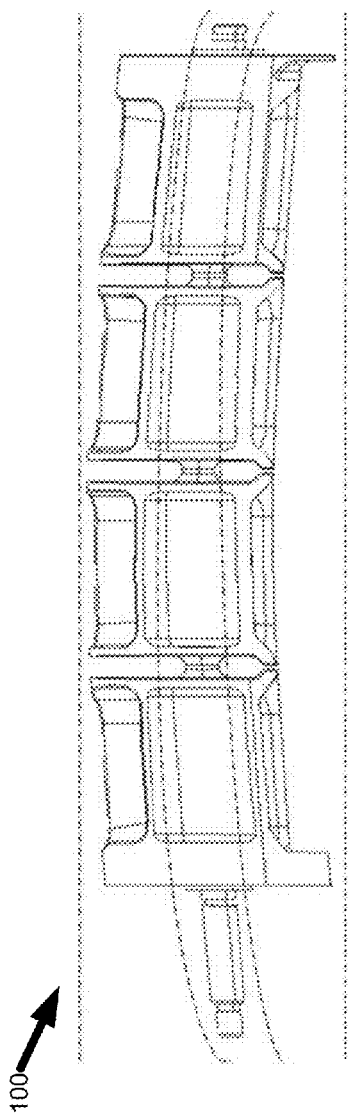
FIG. 9g is a diagram illustrating a different view of the rotary valve in FIG. 9f.

FIG. 9f is a diagram illustrating an example of the flexibility of a rotary valve 101, and how such flexibility helps maintain a tight fit with the housing component 110 even as the housing component 110 warps. FIG. 9g is a diagram illustrating a different view of the rotary valve in FIG. 9f. FIG. 3 also illustrates the ability of the rotary valve apparatus 100 to flex in order to accommodate changes in the housing component 110. The flexibility of the rotary valve apparatus 100 minimizes the external gap 182 between the segments 102 of the apparatus 100 and the housing component 110 while increasing the surface area of the body 101 that is in contact with the housing component 110, spreading out any stresses between the two over a larger contact area.

VI. Tapered Shape of Rotary Valve

In addition to the benefits of flexibility in enhancing the fit between the rotary valve body 101 and the housing component 110, the fit is also enhanced by the positioning of the rotary valve body 101 within the housing component 110.

Alternatively or in addition to a tapered shape, an intended draft or protrusion can be used to secure the rotary valve body 101 more snuggly within the housing component 110. Use of a protrusion or draft can be particularly effective in conjunction with a tapered housing and tapered member. O-rings, springs, and/or other components can be used at the horizontal ends of the member to more securely fasten the member with respect to horizontal movement within the housing.

FIG. 9a is a diagram illustrating an example of how the rotary valve body 101 can be secured within a housing component 110. As illustrated in FIG. 9a, the valve body 101 and the housing component 110 can be tapered to increase the contact area between the two and/or to reduce the external gap 182 between the body 101 and the housing component 110 (or the segments 102 of the apparatus 100 if the connectors 104 are smaller in diameter). In some embodiments, the distance between the segment 102 and the housing component 110 will be approximately 0.25 mm but this distance may need to be smaller or can be larger, depending upon the performance requirements of the application and the effective diameter of the intake manifold's runners. A tapered geometry facilitates ease of assembly as well as enhancing the tightness of the fit between the body 101 and the housing component 110.

FIG. 9b is a block diagram illustrating an example a rotary valve and a housing component with tapered dimensions. This illustration shows how a tapered shape can reduce the external gap 182 between the rotary valve body 101 and the housing component 110.

FIG. 9c is a diagram illustrating an exaggerated example of a taper angle 184 on a rotary valve body 101. The taper angle 184 is 0 degrees if each segment 102 in the body 101 is exactly equal in size. In many embodiments, the taper angle will be between about 0.25 degrees and 5 degrees. In some embodiments, a taper angle between about 0.5 degrees and 3 degrees will be desirable. As illustrated in FIGS. 9a, 9b, 9d, and 9e, the portion of the rotary valve body 101 with the largest diameter is adjacent to the shaft-threaded end 112 and the portion of the body 101 with the smallest diameter is adjacent to the shaft-blind end 114 which permits ease of assembly for this design. Some designs may also reverse the taper direction for both the valve body 101 and the housing 110. As illustrated in those same figures, the shaft-threaded end 112 is typically longer than the shaft-blind end. In many embodiments, the housing component 110 will also have its own taper angle that may be substantially equal to the taper angle 184 of the apparatus 100.

FIG. 9d is a diagram illustrating an example of a rotary valve apparatus 100 with a tapered shape.

FIG. 9e is a diagram illustrating a different view of the rotary valve apparatus 100 displayed in FIG. 9e.

VII. Absorbing Motion of Rotary Valve within Housing Component

The o-rings (168, 162, and 160) serve to absorb the horizontal (axial rotational/longitudinal) motion of the rotary valve body 101 within the housing component 110. Various components such as springs can be used as alternatives to or even additions to the o-rings.

This configuration reduces vibration by reducing rotary barrel valve vibration on the rotational and longitudinal axis. A rotary valve body 101 can include a wide variety of different radial seals for both sealing to the external environment (not for sealing runners) and vibration absorption in the radial and axial directions. The apparatus 100 can minimize both radial and axial direction vibration due to the provided compliance of the valve and novel tapered geometry.

VIII. Shape of Openings

A variety of differently geometric shapes can be integrated into the openings 106 of the segments 102 rather than being added as separate components to the apparatus 100. For example, the openings 106 of the rotary valve member 101 could be trumpet-shaped bellmouth openings, other types of bellmouth openings, or entirely different shapes altogether. By incorporating such a shape directly into the body 101 rather than requiring the juxtaposed housing 110 to have the bellmouth shape, the injection mold tool structure and manufacturing process can be simplified, reducing the cost of manufacturing the system 99

As discussed above, the shape of the opening 106 can have a dramatic impact on the torque of an engine. In the prior art, different bellmouth shapes are integrated to and molded into the housing 110. By molding the openings 106 in the desired shape, the cost and complexity of adding on a specifically shaped entrance condition after the fact is avoided. The segment/connector structure of the apparatus 100 makes it possible to injection mold a bellmouth shape, such as a trumpet bellmouth shape 184 directly into the openings 106 of the body 101, which can result in certain performance benefits for some engines.

Figure 10A:
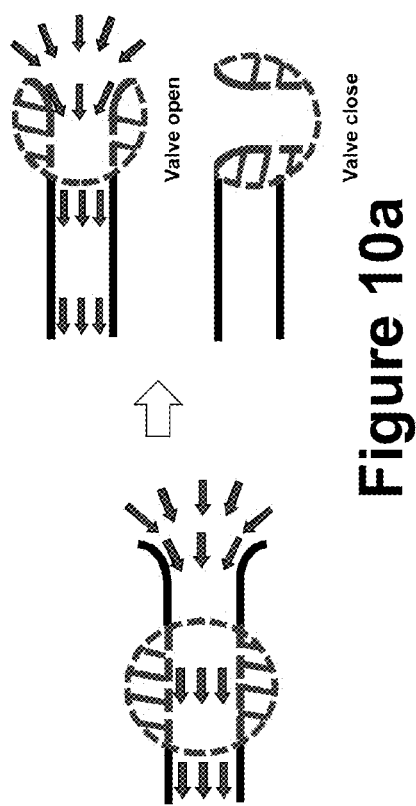
FIG. 10a is a diagram illustrating the different operating states of a rotary valve.
Figure 10B:
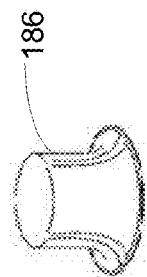
FIG. 10b is a diagram illustrating an example of a trumpet shaped bellmouth opening.

FIG. 10a is a diagram illustrating the different operating states of a rotary valve apparatus 100. In the embodiment illustrated in FIG. 10a, there is no operating state between fully open and fully closed. In alternative embodiments, varying degrees of partially open/partially closed can be implemented.

FIG. 10b is a diagram illustrating an example of a trumpet shaped bellmouth opening 186.

Figure 10C:
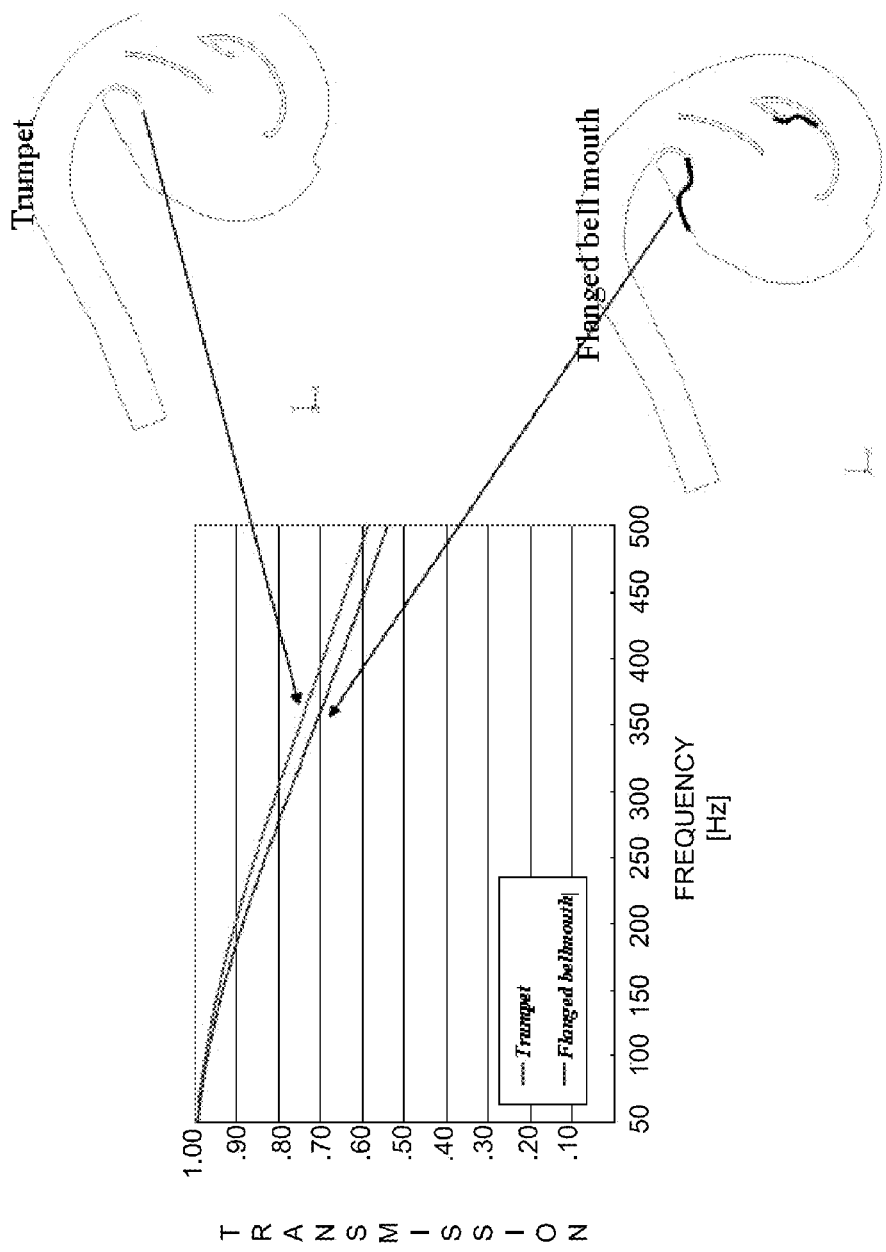
FIG. 10c is a diagram illustrating an example of a trumpet shaped opening with a flanged bellmouth opening.

FIG. 10c is a diagram illustrating an example of a trumpet shaped opening in contrast with a flanged bellmouth opening. As illustrated in the disclosed graph of transmission (y-axis) and frequency (x-axis), the trumpet shape 186 has superior operating characteristics to the flanged bellmouth shape for many engine configurations.

IX. Alternative Embodiments

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The apparatus can be implemented in a wide variety of different embodiments involving a wide variety of different components and configurations. A wide variety of different materials can be used to construct the components and different functional specifications can be incorporated into the performance of the apparatus as desired.

The invention claimed is:

1. A rotary valve apparatus for use in an intake manifold assembly, said rotary valve apparatus comprising:
   a rotary valve body including a plurality of segments, a plurality of connectors, and a plurality of openings;
   wherein said connectors and said segments are positioned in a substantially sequential manner;
   wherein said rotary valve apparatus is substantially cylindrical in shape;
   wherein said openings are located within said segments; and
   wherein said rotary valve body does not include a seal.

2. The rotary valve apparatus of claim 1, wherein at least one said connector is positioned between any two said segments, wherein all said segments and all said connectors are positioned in a substantially singular horizontal sequence, wherein said rotary valve apparatus is substantially in the shape of a conical cylinder, and wherein said rotary valve apparatus is not a flap valve.

3. The rotary valve apparatus of claim 1, further comprising a plurality of internal gaps located above and below said connectors.

4. The rotary valve apparatus of claim 1, wherein said connectors enhance the flexibility of said rotary valve apparatus.

5. The rotary valve apparatus of claim 4, wherein said connectors are comprised of a different material than said segments and wherein said connectors are more flexible than said segments.

6. The rotary valve apparatus of claim 1, wherein said rotary valve apparatus comprises 4 segments, 4 openings, and 3 connectors.

7. The rotary valve apparatus of claim 1, wherein said plurality of segments have a diameter larger than said plurality of connectors.

8. The rotary valve apparatus of claim 1, wherein said plurality of segments have a diameter approximately 3 times larger than said plurality of connectors.

9. The rotary valve apparatus of claim 1, wherein said rotary valve body is comprised of plastic.

10. The rotary valve apparatus of claim 1, wherein said rotary valve apparatus further comprises a shaft-threaded end and a shaft-blind end.

11. The rotary valve apparatus of claim 1, wherein at least one said opening has a trumpet shaped bellmouth.

12. The rotary valve apparatus of claim 10, said rotary valve apparatus further comprising a partially enclosed housing component, wherein said connectors and segments are fixed in a substantially horizontal sequence within said partially enclosed housing component, and wherein said trumpet shaped bellmouth is not part of said housing component.

13. The rotary valve apparatus of claim 1, said rotary valve apparatus further comprising a housing component, and wherein said housing component and said horizontal sequence include a taper angle of between approximately 0.25 degrees and 5 degrees.

14. The rotary valve apparatus of claim 1, said rotary valve apparatus further comprising a housing component, wherein said housing does not include a gasket or an elastomeric component, and wherein said housing component is substantially cylindrical in shape.

15. The rotary valve apparatus of claim 1, said rotary valve apparatus further comprising a housing component, wherein a first external distance between at least one said segment and said housing component is less than a second external distance between at least one said connector and housing component.

16. A rotary valve assembly, comprising:
a rotary valve body comprising a plurality of segments, a plurality of connectors, and a plurality of openings, wherein said segments and said connectors are fixed into a substantially horizontal single-file sequence, and wherein each said segment includes at least one said opening, wherein said rotary valve body does not include a seal, and wherein no segment touches any other segment, wherein said rotary valve body is substantially cylindrical in shape; and
a partially enclosed housing component, wherein said rotary valve body is enclosed within said partially enclosed housing component, wherein said openings of said rotary valve body are blocked by said partially enclosed housing component when said rotary valve apparatus is in a closed position, and wherein said openings of said rotary valve body are not blocked by said partially enclosed housing component when said rotary valve assembly is in an open position.

17. The rotary valve assembly of claim 16, wherein said segments are larger in diameter than said connectors; wherein said partially enclosed housing component is substantially cylindrical in shape; wherein at least one said opening is a trumpet shaped bellmouth; wherein said partially enclosed housing component does not include an inlet funnel; and wherein said partially enclosed housing component and said rotary valve body include a taper angle of between approximately 0.5 degrees and 3 degrees.

18. The rotary valve assembly of claim 16, further comprising:
a shaft-threaded end attached to a first substantially circular face of said member;
a shaft-blind end attached to a second substantially circular face of said member;
a plurality of bushings, with at least one said bushing positioned adjacent to said shaft-threaded end, with at least one said bushing positioned adjacent to said shaft-blind end;
a plurality of o-rings positioned adjacent and exterior to said bushings;
a cap positioned substantially adjacent to said shaft-threaded end;
a vacuum seal positioned adjacent and exterior to said cap;
a bearing positioned adjacent and exterior to said vacuum seal;
a lever positioned adjacent and exterior to said bearing; and
a nut positioned adjacent and exterior to said lever.

19. The rotary valve assembly of claim 16, further comprising a plurality of internal gaps, wherein said rotary valve body is comprised of plastic, and wherein said internal gaps are located above and below said connectors.

20. A method for operating a rotary valve apparatus within an at least partially enclosed housing component in an intake manifold assembly, said method comprising:
rotating a rotary valve body within the housing component to a closed position wherein a plurality of openings within said rotary valve body are blocked and sealed by said partially enclosed housing component; and
rotating the rotary valve body within the housing component to an open position wherein said openings within said rotary valve body are not blocked by said housing component;
wherein the rotary valve body and the partially enclosed housing component are tapered, wherein the rotary valve body is substantially cylindrical in shape, and wherein the rotary valve body does not include a seal.

* * * * *